422-66 SR
OR RE 28,339
140171
Feb. 18, 1975 T. MAXON Re. 28,339
ANALYSIS ARRANGEMENT FOR MULTIPLE ANALYSES OF A SINGLE SAMPLE
RE. 28,339
Original Filed Oct. 6, 1969
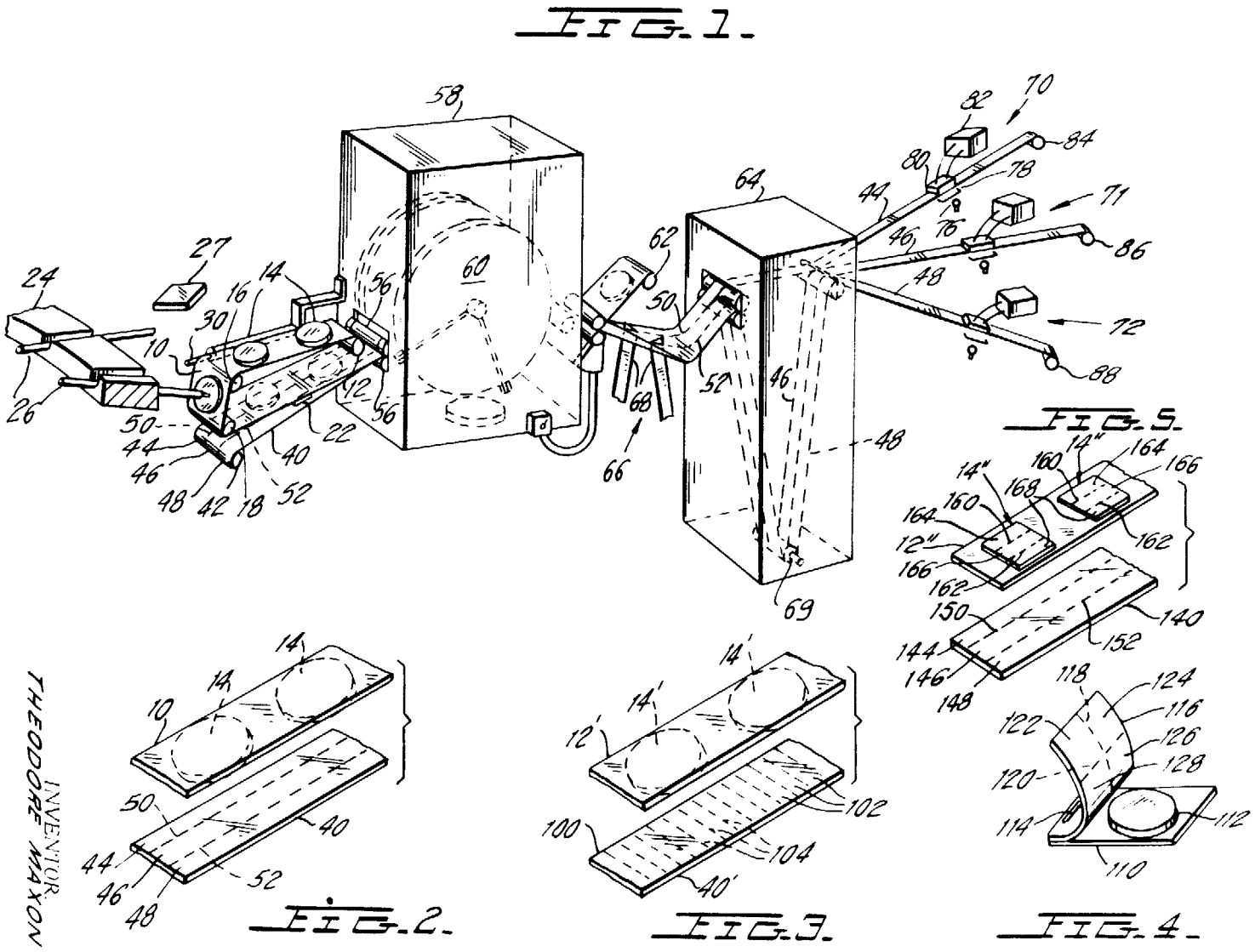
INVENTOR.
THEODORE MAXON
BY
OSTROLENK, FABER, GERB & SOFFEN
ATTORNEYS United States Patent Re. 28,339
Reissued Feb. 18, 1975

28,339

ANALYSIS ARRANGEMENT FOR MULTIPLE ANALYSES OF A SINGLE SAMPLE

Theodore Maxon, Elmhurst, N.Y., assignor to Automated Analyzers, Inc., Mineola, N.Y.

Original No. 3,607,090, dated Sept. 21, 1971, Ser. No. 863,943, Oct. 6, 1969. Application for reissue May 11, 1973, Ser. No. 359,488
Int. Cl. G01n *1/00, 1/28, 21/00*
U.S. Cl. 23—253 R 23 Claims

Matter enclosed in heavy brackets [ ] appears in the original patent but forms no part of this reissue specification; matter printed in italics indicates the additions made by reissue.

ABSTRACT OF THE DISCLOSURE

A liquid sample analysis arrangement comprising a liquid sample receiving, holding and transferring strip medium made from an elongated tape having a plurality of spaced liquid sample absorbing locations on one face thereof, and an analyzing strip medium comprising an elongated tape which is divided into a plurality of discrete analyzing portions; said arrangement may be used in conjunction with an analyzing apparatus comprising means for dispensing liquid sample to the receiving medium and means for causing transfer of the dispensed liquid sample to a plurality of the discrete portions of the analyzing medium, whereby a separate analysis of a single liquid sample may be performed on each of the discrete portions of the analyzing medium; an alternate embodiment of analysis arrangement has sample dispensed to the receiving medium and has a reagent on each discrete portion of the other strip medium, with the reagent from each portion of the latter medium being transferred by the analyzing apparatus to the former medium so that discrete analyses are performed on the former medium; in a still further embodiment, the sample-receiving medium is also divided into a plurality of discrete portions, so that back transfer of each reagent, as in the alternate embodiment, is only to one discrete portion of the receiving medium.

This invention relates to an improved analysis arrangement for chemical analysis of liquid samples, and particularly to such an arrangement for multiple analyses of a single liquid sample.

In chemical laboratories, quite often a large number of individual liquid samples must be rapidly analyzed. Multiple analyses are time consuming and often tedious to an operator. This results in frequent human errors due to the large number of samples being analyzed and to the close attention required of an operator during each step of the analysis procedure. Also, there are limitations in the speed at which an operator can analyze each sample individually.

A simplified analyzing apparatus has been designed, which is simpler in construction and much easier to operate and which is capable of rapidly analyzing minute liquid samples with a minimum of human participation in the analysis procedure, thereby reducing the problems of human error. See U.S. Pat. No. 3,036,893 issued on May 29, 1962 to Samuel Natelson, entitled "Automatic Chemical Analyzer," and assigned to the assignee hereof. The liquid samples to be analyzed are each placed in a capillary tube having a very narrow opening, whereby a small quantity of sample is required to fill each tube. The samples are dispensed to an elongated receiving tape medium. The sample-receiving medium is superimposed over a porous tape medium which is, in turn, superimposed over an analyzing tape medium. The three tape mediums are squeezed together. The liquid sample on the sample-receiving medium is diffused through and is filtered by the porous medium and passes to the analysis medium. The sample reacts with a reagent that is applied to the analysis medium. After the reaction takes place, the tape is analyzed to study the results of the analysis. With this arrangement, only a single analysis procedure may be performed on the single charge of sample that has been transferred to the analysis medium.

The three tape mediums used in conjunction with the above-described analyzer are separately described in U.S. Pat. No. 3,261,668 issued on July 19, 1966 to Samuel Natelson entitled "Chemical Analyzer Tape" and assigned to the assignee hereof.

As the techniques of dispensing liquid samples to automatic chemical-analyzing apparatus have improved, it has become apparent that in certain applications, the analyzing procedure may be performed with fewer than three tape mediums. U.S. Pat. No. 3,368,872 issued Feb. 13, 1968 to Samuel Natelson, entitled "Automatic Chemical Analyzer" and assigned to the assignee hereof, shows the provision of only two tape mediums, the porous medium and the analyzing mediums. With this analysis arrangement, also, only a single analysis procedure may be performed on a single charge of liquid sample.

As liquid sample dispensing and analyzing techniques have further improved, it has been found that analysis may be performed when only the sample receiving, holding and transferring tape medium and the analyzing tape medium are provided. This is described in greater detail in U.S. application Ser. No. 829,562, filed June 2, 1969 by Theodore Maxon and Lowell A. Kleiman, entitled "Improved Analysis Arrangement for Chemical Analyzing Apparatus" and assigned to the assignee hereof (M-5930). With these arrangements also, when a charge of liquid sample is dispensed, only a single analysis may be performed on the charge of liquid sample.

Quite often, it is necessary to perform a number of tests on a single sample of liquid, e.g. blood. With all of the above-described apparatus, each analysis of an individual liquid sample for each component must be conducted separately, requiring a separate sample-dispensing operation, sample transferring operation and analyzing operation. Each separate analysis procedure must be performed on a different apparatus or sequentially on the same apparatus. The present invention overcomes this drawback of all of the analyzing apparatus described above by permitting a number of separate analysis procedures to be simultaneously performed on a single charge of liquid sample with a single analyzing apparatus. In addition, the present invention may be used with all of the apparatus described above.

In a first embodiment of the present invention the analysis strip medium is formed to have a plurality of discrete portions so arranged that a single charge of liquid sample, which is transferred from the sample receiving medium to the analysis strip medium, is transferred to a plurality of the discrete portions of the analysis strip medium, on each of which portions a separate analysis operation may be performed to determine a different characteristic of the liquid sample.

The benefits of this arrangement are immediately apparent. A plurality of separate analysis operations which previously would have had to be performed on separate charges of the same supply of sample at different times may now be simultaneously performed. The volume of liquid sample which must be extracted from the sample source, so that multiple analyses can be performed on a single sample, is reduced if a single small sample charge can have multiple analyses performed on it. There is greater efficiency in simultaneously performing a plurality of analyzing procedures which previously had to be performed sequentially.

An analysis strip medium may be separated into a plurality of discrete portions in a number of different ways in accordance with the invention. Some of these ways are now described as exemplary. First, the analyzing strip medium may be divided into a number of separate neighboring portions, each of which is separated from its neighbor by a separating means which prohibits migration of liquid sample and/or reagent from one of the discrete portions to the other discrete portions. Such separation might occur through the use of walls between neighboring discrete portions, or through the placement of material which does not conduct liquid between neighboring discrete portions.

Alternatively, the discrete portions each might be separated by weakened separating means, e.g. perforations, which are adapted to be torn, e.g. by a cutting means or other dividing means, thereby to physically separate each of the discrete portions. This enables separate analysis procedures to be carried out on each discrete portion without interference due to the presence of the other portions.

Preferably, the analysis medium consists of an elongated tape to which the liquid sample is transferred, e.g., from a sample receiving, holding and transferring, medium. The analysis tape would be used in conjunction with the analyzing apparatus of aforementioned U.S. Pat. No. 3,306,893, although the invention is not limited to use with that apparatus. The analysis tape medium has a plurality of parallel, neighboring, separated channels extending in the direction of extension of the elongated tape. Each charge of liquid sample is transferred from the sample receiving tape to a plurality of the channels. On each channel, a separate analysis operation can be performed to determine a different characteristic of the single charge of liquid sample.

In a modified form, the discrete portions or channels of the tape may be arrayed transversely to the direction of extension of the tape, rather than parallel thereto. Here, too, liquid sample is transferred to a plurality of the discrete portions of the analysis medium.

It is not necessary, however, that the analyzing strip medium be an elongated tape. In a third form of the invention, the analyzing medium comprises a short length patch or tab which has a plurality of discrete portions thereon to each of which liquid sample is transferred.

While a plurality of discrete portions may be provided, for each charge of liquid sample, not all of the portions may be used. Individual charges of liquid sample may be transferred to different ones of the plurality of available discrete portions, instead of all liquid samples being transferred to all of the portions.

Since it is contemplated that each charge of liquid sample would be subjected to a different analysis procedure on each of the discrete portions of the analysis medium, the materials of which each discrete portion are comprised may differ to enable each portion to accept and properly combine the sample and the reagent. For example, in some analysis procedures it may be desirable to apply reagent to a dry analysis medium before liquid sample is transferred to the analysis medium and in other procedures it may be desirable to apply reagent only after the sample has been transferred to and has wet the analysis medium. Or, different reagents are applied in liquid form or in solid form and require different materials to support them.

In a second embodiment of the invention, the analysis medium, which is divided into discrete portions, has reagent applied to and held on these portions in a manner such that reagent is transferred from these portions to the sample reciving medium by the transferring means of the analyzing apparatus. This arrangement would be preferred, for example, when there is a very small quantity of sample to work with and too little would be available for analysis if sample had to be transferred from the receiving medium, or where the sample is too viscous to be readily or rapidly transferred.

After transfer of separate reagents to the sample receiving medium in accordance with the just described embodiment, the reagents might migrate across the sample receiving medium and undesirably mix together. In accordance with a third embodiment of the invention, the sample receiving medium, to which reagent is transferred, is also divided into discrete portions. These portions correspond in their positions to the discrete portions of the reagent holding medium, so that reagents transferred from the reagent holding to the sample receiving medium are not able to migrate away from the respective portions of the sample receiving medium to which they are transferred. Although the sample receiving medium is divided into discrete portions, it is contemplated that one charge of dispensed liquid sample will extend across the sample receiving medium and, therefore, across a plurality of discrete portions. Thus, a plurality of analysis may be performed on a single charge of sample.

Accordingly, it is a primary object of the present invention to provide an improved analysis arrangement for use in conjunction with a chemical analyzing apparatus.

It is another object of the present invention to provide an improved analysis arrangement for rapidly and simply analyzing a plurality of liquid samples.

It is another object of the present invention to provide an improved analysis arrangement for rapidly and simply performing a plurality of analysis procedures on a single liquid sample.

It is another object of the present invention to provide an improved analysis arrangement which minimizes the quantity of a single liquid sample which must be provided for permitting a plurality of separate analyses to be performed on the single charge of liquid sample.

It is a further object of the present invention to permit a plurality of analysis procedures to be simultaneously performed on a single charge of liquid sample.

It is still another object of the present invention to perform a plurality of analysis procedures for a single liquid sample on a single medium.

It is yet another object of the present invention to perform each of said analysis procedures on a discrete portion of a single medium, without contamination of one procedure on one portion by materials from another discrete portion.

It is another object of the present invention to minimize the chances of human error affecting sample analysis procedures.

These and other objects of the present invention will become apparent when the following description is read in conjunction with the accompanying drawings in which:

FIG. 1 shows one form of a first embodiment of improved analysis arrangement designed in accordance with the present invention being used in conjunction with a chemical analyzing apparatus;

FIG. 2 is a segment of the analysis arrangement of FIG. 1 showing this arrangement in greater detail;

FIG. 3 shows a second form of the first embodiment of analysis arrangement for use in conjunction with the apparatus of FIG. 1;

FIG. 4 shows a third form of the first embodiment of analysis arrangement designed in accordance with the present invention; and FIG. 5 shows another embodiment of analysis arrangement designed in accordance with the present invention.

Referring to the figures, and particularly to FIGS. 1 and 2, the sample receiving, holding and transferring medium 10 comprises an elongated, flexible, nonabsorbent, inert tape, formed of plastic, for example, which is unwound from fixedly positioned payoff reel 12. Tape 10 has a plurality of spaced apart absorbent locations 14 on it for receiving and holding liquid sample dispensed by a dispensing apparatus to be described briefly below. Preferably, the absorbent locations are each adapted to hold a uniform volume of liquid sample. The design of such absorbent locations is considered in greater detail in U.S.

application Ser. No. 726,652, filed May 6, 1968 by Theodore Maxon, entitled "Method for Obtaining a Known Volume of Liquid and Absorption Apparatus Therefor" and assigned to the assignee hereof. All of the locations 14 may be comprised of absorbent pads. Each pad is formed of the same material or of material having identical absorption characteristics, viz, the ability to absorb, until saturated, a predetermined quantity of liquid per unit volume of absorbent pad material. Each pad may have identical dimensions, especially the surface area of the outside face of the absorbent pad 14. When all the pads 14 are uniform, if liquid sample is applied to each of them until it is saturated, since all pads have a uniform absorption characteristic, each pad will be holding a uniform predictable volume of liquid sample. The pads are at regularly spaced intervals on tape 10 so that the sample on one pad will not mingle with the sample on another. The pads 14 have surface dimensions such that each is able to contact a plurality of the discrete portions of the analysis medium 40 described below.

Refer to FIG. 1. A preferred form of dispensing apparatus for dispensing liquid sample is shown in U.S. Pat. application Ser. No. 751,816, filed Aug. 12, 1968 by Robert Davis, Theodore Shlisky, John Silverman and William Pipa, entitled "Sample Dispensing Apparatus," and assigned to the assignee hereof.

Tape 10 passes from reel 12 over spools 16 and 18. Each time a pad 14 arrive at the sample-receiving location between spools 16 and 18, a sensing apparatus 22 senses when the pad 14 has arrived at the sample-receiving location and sends a signal which temporarily halts the movement of tape 10.

Simultaneously with the movement of tape 10, a sample receptacle support plate 24, comprising a rotatable disc, is rotating the next sample holding receptacle, i.e. capillary 26, into the dispensing position to have its contents dispensed to the absorbent pad 14 then at the receiving location. A sensing device 27 senses when the next capillary 26 is in the dispensing position and sends a signal which temporarily halts plate 24.

When both tape 10 and plate 24 have halted, a solenoid device 30 is operated to shift the portion of the tape 10 between spools 16 and 18 so that the absorbent pad 14 at the receiving location between the spools is shifted to a sample transfer position in the immediate vicinity of, or in contact with, the outer end of the capillary 26 at the dispensing position. If the absorbent pad contacts the end of the capillary tube, sample may be drawn out of the capillary tube by capillary action. Alternatively, the liquid sample may be blown or otherwise forced out of the capillary tube onto the pad.

After the desired volume of sample has been transferred to a pad 14, solenoid device 30 reshifts the portion of tape 10 between spools 16 and 18 to the inoperative position, and both tape 10 and plate 24 again move to position the next pad 14 and capillary 26, respectively, so that the next dispensing operation can take place.

The above-described apparatus employs a timing device for coordinating the action just described.

When tape 10 first unwinds from reel 12, absorbent locations 14 are facing outward to enable them to receive sample being dispensed. Once locations 14 receive sample and move around spool 18, they are facing inward with respect to the next described analyzing strip medium 40, and are shown in dashed line since they are hidden.

Analyzing strip medium 40 in FIGS. 1 and 2 also comprises an elongated flexible, inert tape. It too may be formed of plastic, for example. It unwinds from payoff reel 42. Tape 40 comprises three parallel elongated discrete portions 44, 46 and 48 which are channels extending in the direction of extension of tape 40. Each of the neighboring channels is separated from the adjacent channels by a separating means 50, 52. The illustrated separating means comprises perforations through tape 40. Alternatively, the separating means might comprise gaps of sample nonreceiving material between adjacent channels or might comprise raised walls or other separating means. Each of the discrete portions 44, 46 and 48 may be separately formed of different material e.g. one might be absorbent to absorb both the liquid sample and reagent applied to it and another might be nonabsorbent so that both the sample and the reagent are coated on the surface of the tape channel. One of the channels may be impregnated in advance of sample transfer with reagent. Another channel may be treated with reagent after tape 40 is on the instrument, but before sample is transferred to it. Still another channel may have reagent applied to it after sample has been transferred to it.

As shown in FIGS. 1 and 2, each of the absorbent locations 14 is uniformly dimensioned and positioned on tape 10 so that liquid sample on each of the locations 14 will be transferred by the transferring means described below to all of the discrete portions 44, 46 and 48. The locations of the pads and/or the discrete portions may be so chosen and varied that for each of the absorbent locations, sample will be transferred to fewer than all of the analysis medium discrete portions and may be transferred to different ones of these discrete portions for different ones of the individual samples.

After sample has been dispensed to the absorbent locations 14, both of the receiving medium and the analyzing medium, i.e. tapes 10 and 40, move through a superimposing means which brings the mediums together and a transferring means to transfer sample. Tapes 10 and 40 move between the compression rollers 56. The two tape mediums are brought together by these rollers, and the absorbent locations 14 are brought into direct contact with the facing surface of the analysis medium.

Once tapes 10 and 40 pass compression rollers 56, they move together into transfer zone 58, where they are pressed together by being drawn tightly over drum 60. Sample is squeezed out of each pad 14 and transferred to the facing surface of analysis tape 40. Other superimposing means may be used, such as a press that squeezes the tapes together, each time they halt their forward progress, with a predetermined pressure. Sample is transferred to each of the tape channels 44, 46 and 48. Therefore, with one charge of liquid sample from a single capillary 26, three separate analyses may be performed, one on each of the three tape channels 44, 46 and 48. Had more channels been provided, the sample from each pad 14 would have been transferred to more channels and more tests could have been performed.

After sample transfer takes place, both of tapes 10 and 40 exit from transfer zone 58, and tape 10 is then taken up on reel 62.

A separate reaction either has taken place on each of the tape channels by this time, between the sample transferred to it and a reagent applied to the channel, or will take place when the tape channels pass through treatment zone 64. The reaction is measured. If the analyzing apparatus can separately study and analyze each of the reactions while the tape 40 remains a unitary whole, then there is no need to divide the tape into its various portions in order to analyze each of the portions separately. However, if each analyzing apparatus for analyzing a reaction on one of the tape channels might be confused if all of the tape channels passed through the apparatus, e.g., stray signals from the other channels might reach the analyzing apparatus, it would be necessary to divide each of the channels from its neighboring channels. Furthermore, it is often necessary to perform different operations on different ones of the tape channels. It is easier to perform these different operations, e.g. washing, drying, dipping, heating or cooling, if the tape channel to be so operated upon is away from the other tape channels.

In the event that it is desired to remove some of the tape channels from their neighboring channels, a dividing means 66 would be provided for dividing the unitary tape 40 into its separate channels 44, 46 and 48. As illustrated, the dividing means comprises knives 68 which extend upward past tape 40 and cut this tape longitudinally along the separating means 50 and 52.

Analysis tape 40 next moves through treatment zone 64. In this zone, each tape channel may be treated to bring about the desired sample-reagent reaction to be measured. For example, the tape channel may be coated with a reagent, if this has not already been done, or it may be washed, heated, dried, cooled, dipped or otherwise treated to bring about the desired reaction. As illustrated in FIG. 1 for exemplary purposes only, tape channel 44 passes straight through the treatment zone without receiving any treatment and tape channels 46 and 48 pass over roller 69 and through the treatment zone where desired operations are performed on them.

Each of the tape channels 44, 46 and 48 exits from treatment zone 64 and passes to its respective analyzing and reading zone 70, 71 and 72.

Reading zone 70 is typical. A light 76 is shone through a filter 78 and through tape channel 44. The resulting light is sensed by a sensing means 80 which emits a signal that is recorded by recording means 82. The light signal transmitted to sensing means 80 will vary depending upon the type of reaction and the extent of the reaction which occurred between the reagent and the sample tested. After each tape portion has been read, it has taken up on its respective tape takeup reel 84, 86 and 88.

The foregoing describes one embodiment of analysis arrangement designed in accordance with the present invention. This arrangement broadly comprises a strip medium which receives liquid sample dispensed from a dispensing device, holds the sample and transfers the sample to an analysis medium. It also comprises an analysis medium having a plurality of separated discrete portions to which each charge of sample that has been dispensed to the receiving medium is transferred by a transferring means. Each of the discrete portions is then treated separately in order to bring about the desired reaction between reagent on that discrete portion and the sample transferred to that discrete portion.

In FIG. 3, a second form of the first embodiment of analysis arrangement is shown. Analyzing medium 100 has a plurality of discrete portions 102 each of which is separated from its neighboring discrete portions by a separating means 104 which is similar to separating means 50, 52. The neighboring discrete portions 102 in FIG. 3 are arranged to extend transversely to the direction of extension of the tape 100, rather than being parallel to its direction of extension. The invention lies in having each pad 14' transfer the liquid sample it has received to more than one of the discrete portions 102, which each pad is capable of doing with the analysis arrangement of FIG. 3. This arrangement shows that it is not necessary for the neighboring discrete portions be arrayed in any particular pattern.

The present invention has been described in conjunction with a sample receiving, holding and transferring strip medium comprising an elongated tape having absorbent locations thereon, and also in conjunction with an analyzing strip medium comprising an elongated tape having a plurality of discrete portions for receiving sample transferred to the analyzing medium. However, as shown in FIG. 4, which illustrates a third form of the first embodiment of analysis arrangement designed in accordance with the invention, neither of the receiving, holding and transferring strip medium nor the analyzing strip medium need comprise an elongated tape.

In FIG. 4, the receiving, holding and transferring medium comprises a leaf 110 which supports an absorbent location 112 positioned thereon. Location 112 may, like absorbent location 14, be an absorbent pad, having the qualities of the absorbent pad described above.

Attached to leaf 110 by securing means 114 is analysis medium leaf 116 which also comprises a short strip of absorbent material. Leaf 116 is divided by separating means 118, 120 into four discrete quadrants 122, 124, 126 and 128. Separating means may be arranged in any desired manner to provide on leaf 116 as many discrete portions as required. Each of the discrete portions may be treated with a separate reagent or otherwise treated to bring about a different reaction with the portion of the sample on pad 112 that is transferred to that discrete portion of the analyzing medium.

The improved analysis arrangement shown in FIG. 4 is especially adaptable for analyses performed in the field, where access to a chemical analyzer such as that shown in FIG. 1, is difficult. A doctor in his office, for example, might have a supply of the analysis arrangements of FIG. 4 and might perform analyses in his office. The doctor or other operator applies liquid sample to absorbent location 112 until the location become saturated, and then uses finger pressure to squeeze the analyzing medium 116 against the absorbent location 112. This transfers the sample on location 112 to the analyzing medium 116. Absorbent location 112 has the liquid sample on it uniformly distributed so that the liquid sample transferred from that location to the analyzing medium is uniformly spread over each of the discrete portions of analyzing medium 116.

The operator in the field could then analyze the reaction between the liquid sample and the reagent on each of the discrete portions of the analyzing medium. The reaction on only one of the discrete portions, e.g. 122, will be considered as exemplary. The reaction on that particular discrete portion might produce a particular color. The quality of the color or its intensity would depend upon the quantities of the liquid sample. The operator has a color comparison chart with which he compares the color of the reaction with control colors to determine what the reaction shows or he has a special photoelectric reader for this purpose. Alternatively, the mere presence of a particular color might serve as a warning that the liquid sample contains a particular component. For example, if the presence of a particular acidity leyel in a sample were to be determined, the analysis medium could be impregnated with a color responsive acid level measuring substance, e.g. litmus paper, and also could be impregnated with a predetermined concentration of alkaline material. Once the level of acidity in the sample on portion 122 exceeds the alkalinity of analyzing medium portion 122 the color of the analyzing medium portion will change, thereby indicating a predetermined level of acidity. Other uses for the improved analysis arrangement of the present invention can be envisioned by those skilled in the art.

FIGS. 1–4 also illustrate a second embodiment of the present invention. With this embodiment a plurality of simultaneous analyses may be performed on a single charge of liquid sample. Here, sample-receiving medium locations 14, 19' and 112 are formed of a material which can receive, hold and retain the sample. For purposes of this embodiment, any sample transfer to the analysis medium is of no significance and is preferably kept at a minimum level. Reduced transferability may arise because the sample may be too viscous for transfer or it may be quick drying and may become viscous or solid before transfer occurs; because the material of which the receiving locations are comprised hinders transfer, e.g. the material could be very absorbent and each location could have such a large volume that the small volume liquid sample would be so diffused through the location that very little sample would be transferred out of the location by squeezing it.

The reagent holding strip medium 40 would, in this embodiment, be so comprised that the reagent on each of the discrete portion channels 44, 46 and 48, would be transferrable over to the receiving medium locations which have already received their charges of sample. For example, one or more of channels 44, 46 and 48 may be coated with reagent in transferable liquid or gelatinous form. The coating may have been applied immediately before transfer or the channels may have been treated long prior to transfer. Alternatively, the channels may be formed of absorbent material to which liquid reagent is applied. The reagent will be transferred when the two mediums are squeezed together. In this embodiment, it is the sample receiving and holding medium that serves as the analysis medium.

The apparatus of FIG. 1 may be used in conjunction with the foregoing second embodiment except that it is the sample-receiving tape that may be cut by a dividing means, like 68, and that may be treated in a treatment zone, like 64. Each discrete portion of each sample-receiving location on the sample-receiving tape would be analyzed in analyzing and reading zones, like 70, 71 and 72. It would be the reagent holding tape that would be wound up on a pick up spool, like 62, after transfer has occurred.

The sample-receiving locations for the second embodiment just described include no means to prevent the various reagents, once they have been transferred from the discrete channels of the reagent-holding tape, from migrating across or through the sample-receiving locations and from mixing together, thereby perhaps preventing a clear analysis result for each reagent-sample reaction.

The third embodiment, illustrated in FIG. 5, of the analysis arrangement of the invention includes means to prevent undesired migration of transferred reagent. The reagent-holding tape 140 is designed to function similarly to the reagent-holding tape for the second embodiment and has structural elements corresponding to those of tape 40 in FIG. 2. Similar elements in FIG. 2 are correspondingly numbered to FIG. 1, with 100 added to the reference numerals.

Sample-receiving medium 12', which is an elongated tape having the qualities of tape 12, has positioned on it a number of spaced-apart sample-receiving locations 14'. Locations 14'' are formed of the same material and in the same manner as the receiving locations for the second embodiment of the invention. Locations 14'' are shown as having a rectangular, rather than a circular surface. The shape of the surface is a matter of choice. The rectangular shape permits the volume of each portion, described below, of each location 14'' to be substantially equal.

Each location 14'' is separated by separating means 160, 162, that are structurally equivalent to separating means 50 and 52 of FIG. 2, into neighboring discrete portion 164, 166 and 168. Separating means 160 and 162 are so positioned with respect to separating means 150 and 152 on tape 140 that reagent is transferred from each of channels 144, 146 and 148 to only a designated channel or channels on locations 14''. For instance, separating means 150, 152 would be aligned with separating means 160, 162 when tapes 12'' and 140 are brought into engagement prior to transfer. This would cause each reagent to be transferred to those portions of locations 14'' where it is desired. Also, separating means 160, 162 would prevent undesired migration of transferred reagent between neighboring discrete portions of each location 14''.

As in the second embodiment of the invention, any channel dividing by a means like knives 68 would be of tape 12'' and of the locations 14'' thereon. Hence, the tape and locations are made to be readily divided. Once divided, tape 12'' and the locations thereon will be treated identically to the corresponding tape in the second embodiment. All other parts of the third embodiment of the invention may be identical to the corresponding parts of the second embodiment of the invention.

The modified forms of the first embodiment of analysis arrangement which are illustrated in FIGS. 3 and 4 are readily adapted for use with the second and third embodiments of the invention.

Although the invention has been described above with respect to its preferred embodiments, it will be understood that many variations and modifications will be obvious to those skilled in the art. It is preferred, therefore, that the scope of the invention be limited not by the specific disclosure herein but only by the appended claims.

I claim:

1. An analysis system for performing a plurality of analyses on a single liquid sample, comprising:

*a liquid sample receiving, holding and transferring strip medium, which includes at least one means for receiving and holding a single sample dispensed to it;* an analyzing strip medium which is adapted to receive liquid sample transferred to it for being analyzed on said analyzing strip medium;

*said analyzing medium being so positioned with respect to said at least one sample receiving and holding means as to have sample transferred to it from said at least one receiving and holding means;* said analyzing strip medium being divided into a plurality of discrete portions; *said receiving and holding means being adapted to transfer in a single operation its sample contents to said analyzing medium;* at least a first [plurality] *group of* [which] *said portions in said plurality* are positioned and adapted to have a single liquid sample *simultaneously* transferred *from said at least one sample receiving and holding means to the said discrete portions in that said group* [to them] and are adapted to have the sample thereon react with a reagent to produce measurable reaction;

whereby a plurality of discrete analysis operations may be performed [on] *using* a single liquid sample which [is] *has been* transferred *in a single transfer operation* to said first [plurality] *group* of discrete portions of said analyzing medium *from said at least one sample receiving and holding means.*

[2. The analysis system of claim 1, further including a liquid sample receiving, holding and transferring strip medium, which includes at least one means for receiving and holding sample dispensed to it; said receiving and holding means being adapted to transfer its sample contents to said analyzing medium;

said analyzing medium being so positioned with respect to said at least one sample receiving and holding means as to have sample transferred to it from said at least one receiving means;

whereby a plurality of discrete analysis operations may be performed on a single liquid sample which is transferred to said first plurality of discrete portions of said analyzing medium from said sample receiving and holding means.]

3. In combination, the improved analysis system of claim [2] *1*, and a chemical analyzing apparatus, said chemical analyzing apparatus being comprised of a means for holding and dispensing each of said receiving, holding and transferring medium and said analyzing medium;

means for dispensing liquid sample to said receiving and holding means of said receiving, holding and transferring medium;

transfer means moving into contact with both said mediums after liquid sample has been dispensed to said receiving and holding means for *bringing the surface of said receiving medium to which sample has been transferred to be superimposed onto the surface of said analyzing medium upon the reactions are to occur,* [causing coaction between said mediums,] thereby to bring about transfer of sample from said receiving and holding means to said first [plurality] *group* of said discrete portions of said analyzing medium;

analyzing means cooperating with said first [plurality] *group* of discrete portions after sample has been transferred to said first [plurality] *group* of portions and after a reaction on said first [plurality] *group* of portions between the transferred sample and a reagent has occurred, to analyze the reactions on said portions.

4. The combination of claim [5] *3*, further including a dividing means connected to said analyzing apparatus for being brought into contact with said analyzing medium to cause separation of said discrete portions thereof from each other.

5. The analysis system of claim [2] *1*, wherein each said discrete portion of said analyzing strip medium is adapted to receive a reagent to react with the liquid sample transferred to it, thereby to analyze the sample transferred.

6. The analysis system of claim [2] *1*, wherein said receiving, holding and transferring medium includes a plurality of spaced-apart receiving and holding means, each for receiving and holding a separate charge of liquid sample;

said analyzing medium portions being so positioned as to have a sample transferred to a plurality of them from each said receiving and holding means.

7. The analyzing system of claim 6, wherein said analyzing medium includes separating means for separating each of said discrete portions from its neighboring discrete portions, thereby preventing any material on one discrete portion from traveling to another discrete portion.

8. The analysis system of claim 6, wherein said receiving, holding and transferring medium comprises an elongated strip having said receiving and holding means arrayed along said strip;

and said analyzing medium comprises an elongated strip having said discrete portions thereof arrayed in neighboring rows along said strip.

9. The analyzing system of claim 8, wherein said neighboring rows are parallel to each other and extend lengthwise along said analyzing medium.

10. In combination, the improved analysis system of claim 9, and a chemical-analyzing apparatus, said chemical-analyzing apparatus being comprised of means for holding and dispensing each of said receiving, holding and transferring medium and said analyzing medium;

means for dispensing liquid sample to said receiving and holding means of said receiving, holding and transferring medium;

transfer means moving into engagement with both of said mediums after liquid sample has been dispensed to said receiving and holding means for *bringing the surface of said receiving medium to which sample has been transferred to be superimposed onto the surface of said analyzing medium upon the reactions are to occur*, [causing coaction between said mediums.] thereby to bring about transfer of sample from said receiving and holding means to said first [plurality] *group* of said discrete portions of said analyzing medium;

analyzing means cooperating with said first [plurality] *group* of discrete portions, after sample has been transferred to said first [plurality] *group* of portions and after a reaction on said first [plurality] *group* of portions between the transferred sample and a reagent has occurred, to analyze the reactions on said portions.

11. The combination of claim 10, further including a dividing means connected to said analyzing apparatus for being brought into contact with said analyzing medium to cause separation of said discrete portions thereof from each other.

12. The analysis system of claim 9, wherein each said portion of said analyzing strip medium is adapted to receive a reagent to react with the liquid sample transferred to it, thereby to analyze the sample transferred.

[13. The analysis system of claim 1, wherein said analyzing strip medium also comprises a liquid sample receiving and holding strip medium, which includes at least one means for receiving and holding sample dispensed to it;

a separate reagent holding strip medium which is divided into a plurality of discrete portions, to each of which said portions is applied a reagent for reacting with the sample on said at least one means for receiving and holding sample; said reagent holding strip medium being designed so that the reagent on each of said portions thereof may be transferred to said at least one means for receiving and holding sample; said reagent holding medium being so positioned with respect to said at least one sample receiving and holding means as to permit reagent to be transferred from the former to the latter;

whereby a plurality of discrete analysis operations may be performed on a single liquid sample to which a plurality of different reagents are transferred.]

14. The analysis system of claim [13] *28*, wherein said [receiving and holding] *analyzing* medium includes a plurality of spaced apart receiving and holding means, each for receiving and holding a separate *single* charge of liquid sample; *and each being comprised of a respective said first group of portions;* said reagent holding medium *second* portion being so positioned as to have reagent transferred from a plurality of them to [reach] *each* said receiving and holding means.

15. The analysis system of claim [14] *29*, wherein said [receiving and holding] *analyzing* medium comprises an elongated strip having said receiving and holding means arrayed along said strip;

and said reagent holding medium comprises an elongated strip having said *second* discrete portions thereof arrayed in neighboring rows along said strip.

16. The analysis system of claim 15, wherein said neighboring rows are parallel to each other and extend lengthwise along said [analyzing] *reagent holding* medium.

17. The analysis system of claim 14, wherein said reagent-holding medium includes separating means for separating each of said *second* discrete portions from its neighboring *said second* discrete portions, thereby preventing any material on one *said second* discrete portion from travelling to another *said second* discrete portion.

18. The analysis system of claim 17, wherein [each said means for receiving and holding sample is comprised of a plurality of discrete portions, each for receiving a reagent transferred to it from one of said discrete portions of said reagent holding medium;] each said *first* discrete portion of each said means for receiving and holding sample being so shaped that when said [receiving and holding] *analyzing* medium and said reagent *holding* medium are in position to effect reagent transfer, reagent from one *said second* discrete portion will only be transferred to one *said first* discrete portion of said sample receiving and holding means.

19. The analysis system of claim 18, wherein each said means for receiving and holding sample includes separating means for separating each said *first* discrete portion from its neighboring *said first* discrete portions, thereby preventing any material on one *said first* discrete portion from travelling to another *said first* discrete portion.

[20. The analysis system of claim 14, wherein each said means for receiving and holding sample is comprised of a plurality of discrete portions, each for receiving a reagent transferred to it from one of said discrete portions of said reagent-holding medium; each said discrete portion of each said means for receiving and holding sample being so shaped that when said receiving and holding medium and said reagent medium are in position to effect reagent transfer, reagent from one discrete portion will only be transferred to one discrete portion of a said sample receiving and holding means.]

[21. The analysis system of claim 20, wherein each said means for receiving and holding sample includes separating means for separating each said discrete portion from its neighboring discrete portions, thereby preventing any material on one discrete portion from travelling to another discrete portion.]

22. In combination. the improved analysis system of claim [20] *18*, and a chemical-analyzing apparatus, said chemical-analyzing apparatus being comprised of means for holding and dispensing each of said [sample receiving and holding] *analyzing* medium and said reagent holding medium;

means for dispensing liquid sample to said receiving and holding means for said [receiving and holding] *analyzing* medium;

transfer means moving into engagement with both of said mediums after sample has been dispensed to said receiving and holding means for *bringing the surface of said analyzing medium to which sample has been transferred and upon which the reactions are to occur to be superimposed onto the surface of said reagent holding medium,* [causing coaction between said mediums,] thereby to bring about transfer of reagent from said discrete portions of said reagent-holding medium to said discrete portions of *said* sample receiving and holding means;

analyzing means cooperating with said discrete portions of said sample receiving and holding means after reagent has been transferred to them and after reactions on them between the transferred reagent and sample have occurred, to analyze the reactions.

[23. The combination of claim 3, wherein said transfer means includes devices which serve to bring the surface of said receiving medium to which sample has been transferred to be superimposed onto the surface of said analyzing medium upon which the reactions are to occur.]

[24. The combination of claim 10, wherein said transfer means includes devices which serve to bring the surface of said receiving medium to which sample has been transferred to be superimposed onto the surface of said analyzing medium upon which the reactions are to occur.]

[25. The combination of claim 22, wherein said transfer means includes devices which serve to bring the surface of said receiving medium to which sample has been transferred to be superimposed onto the surface of said analying medium upon which the reactions are to occur.]

*26. The analysis system of claim 1, wherein said receiving and holding means is superimposed over said group of discrete portions to effect simultaneous transfer of sample to those said discrete portions.*

*27. The analysis system of claim 1, wherein said receiving, holding and transferring medium includes a plurality of spaced apart receiving and holding means, each for receiving and holding a separate single charge of liquid sample;*

*said analyzing medium portions being so positioned as to have sample simultaneously transferred to a plurality of them from each said receiving and holding means.*

*28. An analysis system for performing a plurality of analyses on a single liquid sample, comprising:*

*an analyzing strip medium which is adapted to receive liquid sample transferred to it for being analyzed on said analyzing strip medium;*

*said analyzing strip medium being divided into a plurality of discrete portions; at least a first group of said portions is positioned and adapted to have a single liquid sample transferred to the portions in said first group and are adapted to have the sample thereon react with a reagent to produce a measurable reaction;*

*a separate reagent holding medium which is divided into a second group of discrete portions, to each of which said second portions is applied a reagent for reacting with the sample on said analyzing medium; said reagent holding medium being designed so that the reagent on each of said second portions thereof may be transferred to said analyzing medium; said reagent holding medium being so positioned with respect to said analyzing medium as to permit reagent to be transferred from said second group of portions of said reagent holding medium to said analyzing medium;*

*whereby a plurality of discrete analysis operations may be performed on a single liquid sample on said analyzing medium to which a plurality of different reagents are transferred.*

*29. The analysis system of claim 28, wherein said analyzing medium is superimposed over said second group of discrete portions of said reagent holding medium to effect simultaneous transfer from said reagent holding medium to said analyzing medium.*

*30. The analysis system of claim 14, wherein each said spaced apart sample receiving and holding means is superimposed over a respective said second group of said reagent holding medium portions to effect simultaneous transfer from said reagent holding medium to said analyzing medium.*

References Cited

The following references, cited by the Examiner, are of record in the patented file of this patent or the original patent.

UNITED STATES PATENTS

| | | | |
|---|---|---|---|
| 3,036,894 | 5/1962 | Forestiere | 23—259 X |
| 3,260,413 | 7/1966 | Natelson | 23—259 X |
| 3,261,668 | 7/1966 | Natelson | 23—253 TP |
| 3,497,320 | 2/1970 | Blackburn et al. | 23—292 X |
| 3,508,879 | 4/1970 | Findl | 23—259 X |
| 3,526,480 | 9/1970 | Findl et al. | 23—253 R |

R. E. SERWIN, Primary Examiner

U.S. Cl. X.R.

23—230 R, 253 TP, 259